United States Patent [19]

Manz

[11] Patent Number: 5,417,075
[45] Date of Patent: May 23, 1995

[54] REFRIGERANT FILTATION SYSTEM WITH FILTER CHANGE INDICATION

[75] Inventor: Kenneth W. Manz, Paulding, Ohio

[73] Assignee: SPX Corporation, Muskegon, Mich.

[21] Appl. No.: 206,322

[22] Filed: Mar. 7, 1994

[51] Int. Cl.$^6$ ............................................. F25B 47/00
[52] U.S. Cl. ........................................ 62/85; 62/195
[58] Field of Search .................. 62/85, 195, 149, 475, 62/292

[56] References Cited

U.S. PATENT DOCUMENTS

| | | |
|---|---|---|
| 4,805,416 | 2/1989 | Manz et al. . |
| 4,939,905 | 7/1990 | Manz . |
| 5,211,024 | 5/1993 | Manz et al. . |
| 5,231,841 | 8/1993 | McClelland et al. ................ 62/125 |

Primary Examiner—John M. Sollecito
Attorney, Agent, or Firm—Barnes, Kisselle, Raisch, Choate, Whittemore & Hulbert

[57] ABSTRACT

Apparatus for purification of refrigerant that includes a replaceable filter/dryer unit for removing water from refrigerant passing therethrough and having a predetermined water absorption capacity, and a compressor for pumping refrigerant through the filter/dryer unit. Refrigerant vapor pressure is measured at the compressor inlet, and mass flow rate of water in the refrigerant pumped through the filter/dryer unit is determined as a function of measured pressure. The mass flow rate of water so determined is monitored over time of operation of the refrigerant pump to determine when the mass of water in refrigerant pumped through the filter/dryer unit reaches the predetermined water absorption capacity of the unit. Filter status may be indicated to an operator and/or operation of the pump may be terminated.

19 Claims, 2 Drawing Sheets

REFRIGERANT FILTATION SYSTEM WITH FILTER CHANGE INDICATION

The present invention is directed to systems for removing water from refrigerant by pumping the refrigerant through a filter/dryer unit, and more particularly to a method and apparatus for monitoring the amount of water absorbed by the filter/dryer unit and indicating when the filter/dryer water absorption capacity has been reached.

BACKGROUND AND SUMMARY OF THE INVENTION

U.S. Pat. No. 5,211,024, assigned to the assignee hereof, discloses an apparatus for purification of refrigerant that includes a refrigerant pump and a filter/dryer unit for removing water from refrigerant pumped therethrough. A flow meter is coupled to the filter/dryer unit for measuring volumetric flow of refrigerant passing through the filter/dryer unit. Volumetric flow of refrigerant through the flow meter is monitored over time for indicating to an operator when the filter/dryer unit should be replaced as a function of mass of refrigerant pumped through the filter/dryer unit and independent of types of refrigerant pumped through the filter/dryer unit. Operation of the refrigerant pump may be inhibited upon indication that the filter/dryer unit should be replaced.

Although the apparatus disclosed in the noted patent addresses and overcomes problems theretofore extant in the art, further improvements remain desirable. For example, the cost of the refrigerant volumetric flow meter is significant, and can limit market acceptance of the apparatus. Moisture concentration and density is assumed to be at the highest expected operating temperature. In addition, filter capacity is wasted for refrigerants whose product of moisture concentration times density is lower than that of other refrigerants. It is therefore an object of the present invention to provide a method and apparatus of the subject character that can be manufactured at reduced cost, and that take into account both refrigerant type and refrigerant temperature/pressure effects on both moisture concentration and density so that the filter/dryer water absorption capacity can be fully utilized for all types of refrigerant and under an enhanced range of operating conditions.

Apparatus for purification of refrigerant in accordance with a presently preferred embodiment of the invention comprises a replaceable filter/dryer unit for removing water from refrigerant passing therethrough, and a refrigerant pump for pumping refrigerant through the filter/dryer unit. At least one predetermined parameter (e.g., pressure or temperature) of the refrigerant flowing through the filter/dryer unit is measured, and actual mass flow rate of refrigerant pumped through the filter/dryer unit is determined as a function of such measured parameter. The mass flow rate of refrigerant so determined is monitored as a function of time of operation of the refrigerant pump, and filter status is indicated to an operator and/or operation of the pump is terminated when need for a filter/dryer change is indicated. The invention thus improves upon the above-noted patent by obtaining an actual measure of refrigerant mass flow rate, rather than measuring volumetric flow rate and estimating mass flow rate while assuming specific refrigerant pressure and temperature conditions.

Actual mass flow rate of water in the refrigerant pumped through the filter/dryer unit preferably is determined as a function of volumetric pumping speed of the pump, which is a constant for a given pump displacement and shaft speed, and water concentration per unit mass of refrigerant which is a function of the measured refrigerant parameter. The mass flow rate of water in refrigerant pumped through the filter/dryer is determined as a function of the pumping speed multiplied by the water concentration per unit mass of refrigerant. Preferably, the relationship of water concentration per unit mass of refrigerant is stored as look-up tables in a microprocessor as a function of the measured refrigerant parameter. Preferably, the refrigerant pump comprises a compressor that pumps refrigerant through the filter/dryer unit in vapor phase, and the measured refrigerant parameter comprises compressor inlet suction pressure. Compressor inlet vapor pressure is more indicative of refrigerant density during final stages of refrigerant recovery when the compressor draws a vacuum on the equipment under service to meet EPA requirements and saturated conditions.

For purification of plural differing refrigerants having differing density and moisture solubility characteristics, the apparatus of the present invention preferably includes facility for identifying and distinguishing among differing refrigerant types. This may be determined, for example, as a function of vapor pressure and temperature of refrigerant fed to the inlet of the compressor/pump. Pumping speed in units of mass per unit time and water concentration per unit mass of refrigerant are determined as a combined function of refrigerant vapor pressure and refrigerant type, preferably by means of look-up tables in a control microprocessor.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
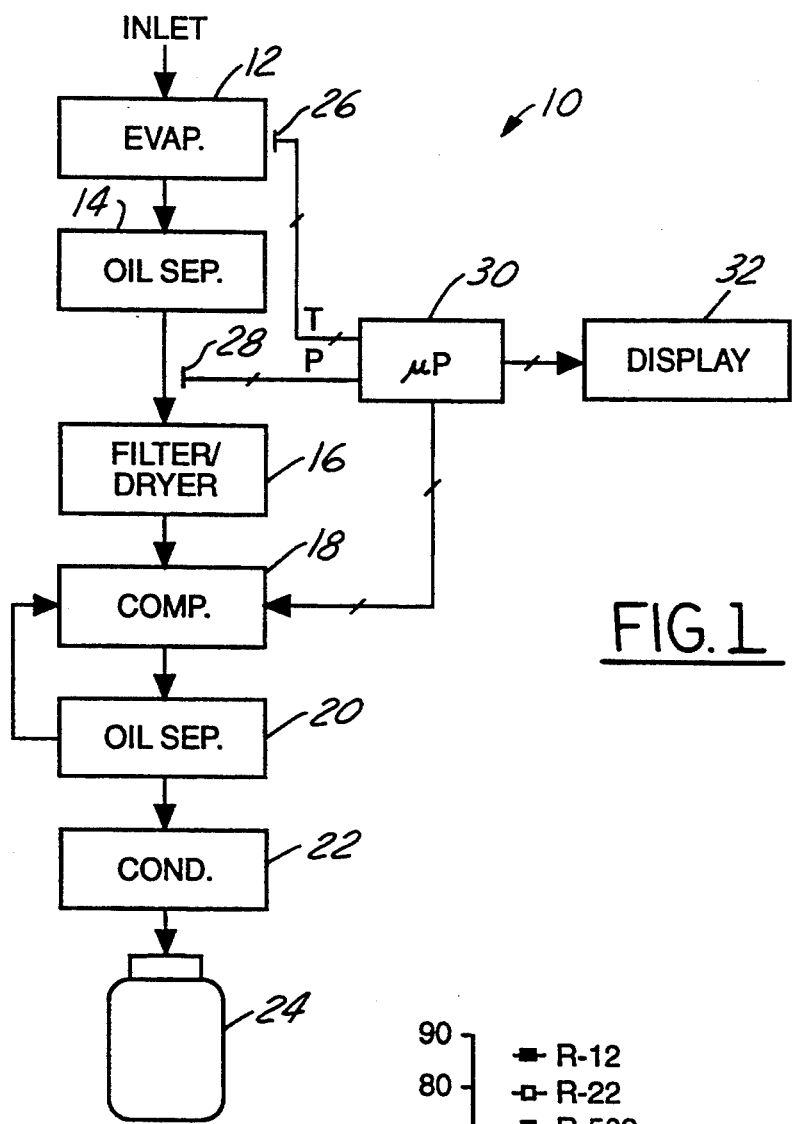
FIG. 1 is a schematic diagram of a refrigerant recovery system embodying a filter/dryer monitor in accordance with a presently preferred embodiment of the invention.

FIG. 1 illustrates a refrigerant recovery system 10 as comprising a refrigerant evaporator 12 having an inlet for receiving refrigerant from refrigeration equipment under service, and an outlet connected through oil separator 14 and a filter/dryer unit 16 to the inlet of a refrigerant compressor 18. Filter/dryer 16 preferably comprises a conventional filter/dryer unit having a replaceable desiccant core for absorbing water from refrigerant passing therethrough. Such filter/dryer units have a predetermined water absorption capacity depending upon volume and desiccant type, such as forty grams of water for example. The outlet of compressor 18 is connected through a compressor oil separator 20 and a refrigerant condenser 22 to a container 24 for storing refrigerant recovered from the equipment under service. In situations where refrigerant will be recovered only in vapor phase, evaporator 12 may be eliminated. To the extent thus far described, refrigerant recovery system 10 is similar to systems disclosed in U.S. Pat. No. 4,805,416 assigned to the assignee hereof, to which reference may be made for more detailed discussion.

Figure 2:
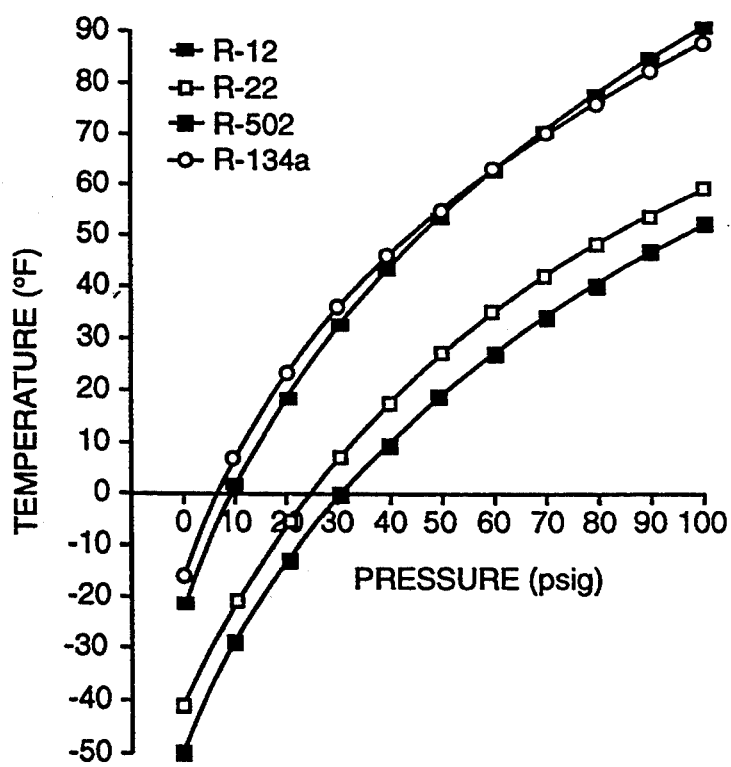
FIGS. 2–4 are graphs that illustrate characteristics of various refrigerant types employed in monitoring filter/dryer status in accordance with the preferred embodiment of the invention.

In accordance with the present invention, a temperature sensor 26 is positioned within or adjacent to evaporator 12 so as to provide an electrical signal T indicative of refrigerant temperature at the evaporator. A pressure sensor 28 is positioned to provide an electrical signal P indicative of inlet refrigerant vapor pressure fed to compressor 18. Signals T and P from sensors 26,28 are fed to a microprocessor-based controller 30 for monitoring operation of filter/dryer 16 as will be described. Microprocessor 30 is coupled to a display 32 for displaying refrigerant type and/or need for filter change to an operator, and to compressor 18 for terminating operation of the compressor when water fed to filter/dryer 16 reaches the water absorption capacity of the dryer. The temperature and pressure signals T and P are employed at microprocessor 30 first to determine refrigerant type by accessing curves such as illustrated in FIG. 2, which preferably are stored as look-up tables within microprocessor 30. For example, if pressure signal P from sensor 28 indicates a refrigerant vapor pressure of 50 psig and temperature signal T from sensor 26 indicates a temperature of 27° F., the refrigerant flowing to compressor 18 is R-22 refrigerant. This information may be displayed at 32, so that the operator may terminate system operation in the event that this refrigerant type is inappropriate for storage container 24.

Figure 3:
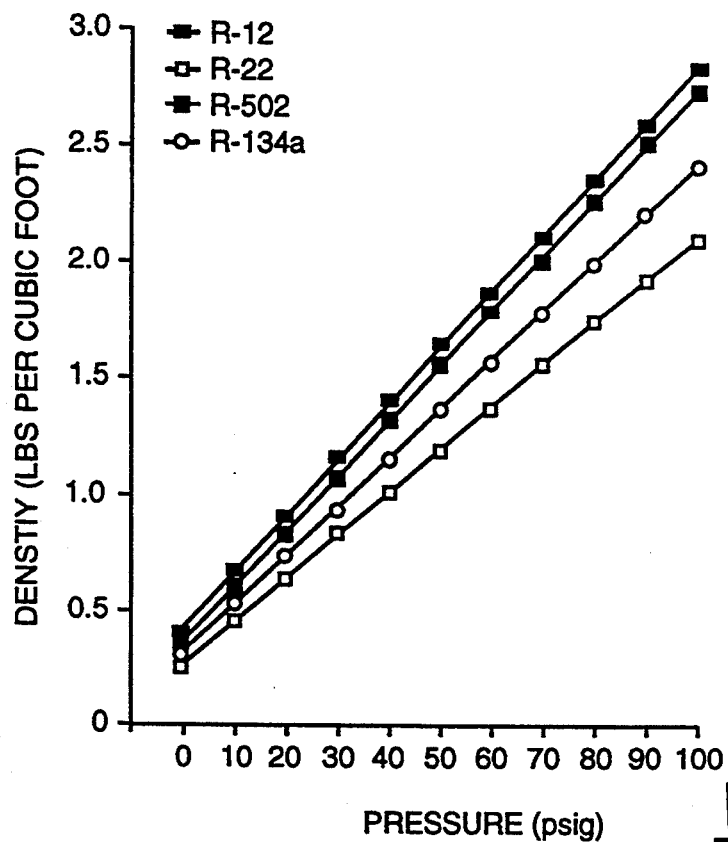

Microprocessor 30 continues to monitor sensors 26,28 during compressor operation. FIG. 3 illustrates density in pounds per cubic foot of refrigerant versus refrigerant vapor pressure for several different refrigerants, which again preferably are stored as look-up tables within microprocessor 30. Similar relationships can be developed for refrigerant vapor density versus temperature since temperature and pressure are related in a known manner under saturation conditions. Pressure P is employed as the independent variable in the preferred embodiment of the invention because pressure is more indicative of refrigerant density during the final stages of recovery when the compressor is pulling the equipment under service down to a vacuum to meet EPA requirements, and saturation conditions are not met. Thus, at each sampling of the signal P from pressure sensor 28, a corresponding refrigerant density in pounds per cubic foot is obtained from the look-up table. Pumping speed, in terms of volumetric flow per unit time, is considered to be constant, being determined by displacement of the pump and pump shaft speed. When refrigerant density is multiplied by this constant, which is stored in microprocessor 30, the product indicates mass flow rate of refrigerant pumped per unit time—e.g., pounds refrigerant per minute.

Figure 4:
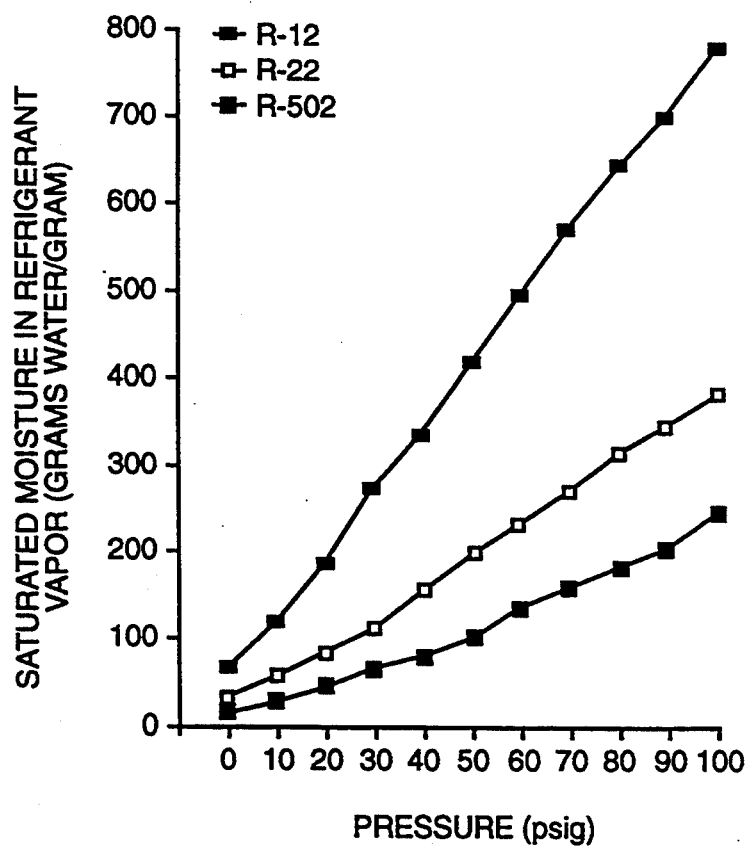

FIG. 4 illustrates saturated moisture concentration in refrigerant vapor in units mass of water per unit mass of refrigerant—e.g., grams water per gram refrigerant. This information again preferably is stored in look-up tables within microprocessor 30, and accessed at each sample reading from pressure sensor 28. The information so obtained, relating mass of water per unit mass of refrigerant, is multiplied by the refrigerant mass flow rate. previously obtained, and the resulting product is indicative of mass of water in refrigerant pumped through filter/dryer 16 per unit time—i.e., the mass flow rate of water into the dryer. This variable is continuously monitored and integrated within microprocessor 30 over time until the sum reaches the predetermined water absorption capacity of filter/dryer 16. Microprocessor 30 at this point so advises the operator at display 32 with a suitable warning or lamp that a filter change is indicated, and/or terminates operation of compressor 18 until reset by the operator after a filter change.

I claim:

1. Apparatus for purification of refrigerant comprising:

replaceable filter/dryer means for removing water from refrigerant passing therethrough and having a predetermined water absorption capacity, refrigerant pumping means for pumping refrigerant through said filter/dryer means, means for measuring a predetermined physical parameter of refrigerant flowing through said filter/dryer means, means for determining as a function of said predetermined physical parameter mass flow rate of water in refrigerant pumped by said pumping means through said filter/dryer means, and means for monitoring said mass flow rate of water as a function of time of operation of said pumping means to determine when mass of water in refrigerant pumped through said filter/dryer means equals said predetermined water absorption capacity of said filter/dryer means.

2. The apparatus set forth in claim 1 wherein said means for determining mass flow rate of water in refrigerant pumped through said filter/dryer means comprises means for determining water concentration per unit mass of refrigerant as a function of said parameter, and means for determining said mass flow rate of water as a function of water concentration per unit mass of refrigerant multiplied by volumetric flow rate of said pumping means.

3. The apparatus set forth in claim 2 wherein said means for determining mass flow rate of water comprises a microprocessor in which water concentration per unit mass of refrigerant is stored as a look-up table as a function of said parameter.

4. The apparatus set forth in claim 2 wherein said predetermined refrigerant parameter is refrigerant vapor pressure.

5. The apparatus set forth in claim 4 wherein said pumping means comprises a compressor having an inlet and means for feeding refrigerant in vapor phase to said compressor inlet, said means for determining mass flow rate being responsive to compressor inlet suction pressure.

6. The apparatus set forth in claim 1 for purification of plural differing refrigerant types having differing moisture solubility characteristics, said apparatus further comprising means for determining type of refrigerant pumped by said pumping means through said filter/dryer means, and means for determining said mass flow rate of water in refrigerant as a combined function of refrigerant type and said parameter.

7. The apparatus set forth in claim 6 wherein said refrigerant pumping means comprises a compressor and means for feeding refrigerant in vapor phase to said compressor, said means for determining refrigerant type comprising means responsive to vapor pressure and temperature of refrigerant fed to said compressor.

8. A method of removing water from refrigerant comprising the steps of:
   (a) pumping the refrigerant through a dryer unit having a predetermined water absorption capacity,
   (b) determining as a function of physical properties of the refrigerant the mass flow rate of water in the refrigerant pumped through the dryer unit in said step (a),
   (c) monitoring said mass flow rate of water determined in said step (b) as a function of time, and
   (d) indicating when total mass of water in refrigerant pumped through said dryer unit reaches said predetermined water absorption capacity of said unit.

9. The method set forth in claim 8 comprising the additional step of: (e) terminating said step (a) when total mass of water reaches said capacity.

10. The method set forth in claim 8 wherein said physical properties of the refrigerant include refrigerant type.

11. Apparatus for purification of refrigerant comprising:
   replaceable filter/dryer means for removing water from refrigerant passing therethrough,
   refrigerant pumping means for pumping refrigerant through said filter/dryer means,
   means for measuring a predetermined physical parameter of refrigerant flowing through said filter/dryer means,
   means for determining as a function of said predetermined physical parameter actual mass flow rate of refrigerant pumped by said pumping means through said filter/dryer means, and
   means responsive to said mass flow rate of refrigerant as a function of time of operation of said pumping means for indicating when to replace said filter/dryer means,
   said means for determining said actual mass flow rate of refrigerant comprising means for determining density of refrigerant pumped by said pumping means as a function of said predetermined physical parameter, and means for determining said actual mass flow rate of refrigerant as a function of refrigerant density multiplied by speed of said pumping means.

12. The apparatus set forth in claim 11 wherein said means for determining actual mass flow rate of refrigerant further comprises means for determining mass flow rate of water in said refrigerant as a function of time of operation of said pumping means to indicate when mass of water in refrigerant pumped through said filter/dryer means equals water absorption capacity of said filter/dryer means.

13. The apparatus set forth in claim 12 wherein said means for determining mass flow rate of water in refrigerant pumped through said filter/dryer means comprises means for determining water concentration per unit mass of refrigerant as a function of said parameter, and means for determining said mass flow rate of water as a function of water concentration per unit mass of refrigerant multiplied by speed of said pumping means.

14. The apparatus set forth in claim 11 wherein said predetermined refrigerant parameter is refrigerant vapor pressure.

15. The apparatus set forth in claim 11 for purification of plural differing refrigerant types having differing moisture solubility characteristics, said apparatus further comprising means for determining type of refrigerant pumped by said pumping means through said filter/dryer means, and means for determining said mass flow rate of refrigerant as a combined function of refrigerant type and said parameter.

16. The apparatus set forth in claim 15 wherein said means for determining refrigerant type comprises means for automatically determining refrigerant type as a function of said predetermined physical parameter.

17. The apparatus set forth in claim 11 wherein said pumping means has a constant volumetric pumping rate.

18. The apparatus set forth in claim 17 wherein said pumping means comprises a compressor having said constant volumetric flow rate determined by pump displacement and pump speed.

19. The apparatus set forth in claim 18 wherein said means for determining density comprises pressure sensing means coupled to an inlet of said compressor.

* * * * *